Feb. 13, 1962  P. KLAMP  3,020,854
RETARDER MECHANISM FOR FREE CONVEYOR LINE
Filed Sept. 21, 1959  4 Sheets-Sheet 1

INVENTOR.
PAUL KLAMP
BY
ATTORNEYS

Feb. 13, 1962 P. KLAMP 3,020,854
RETARDER MECHANISM FOR FREE CONVEYOR LINE
Filed Sept. 21, 1959 4 Sheets-Sheet 2

INVENTOR.
PAUL KLAMP
BY Whittemore Hulbert +
Belknap
ATTORNEYS

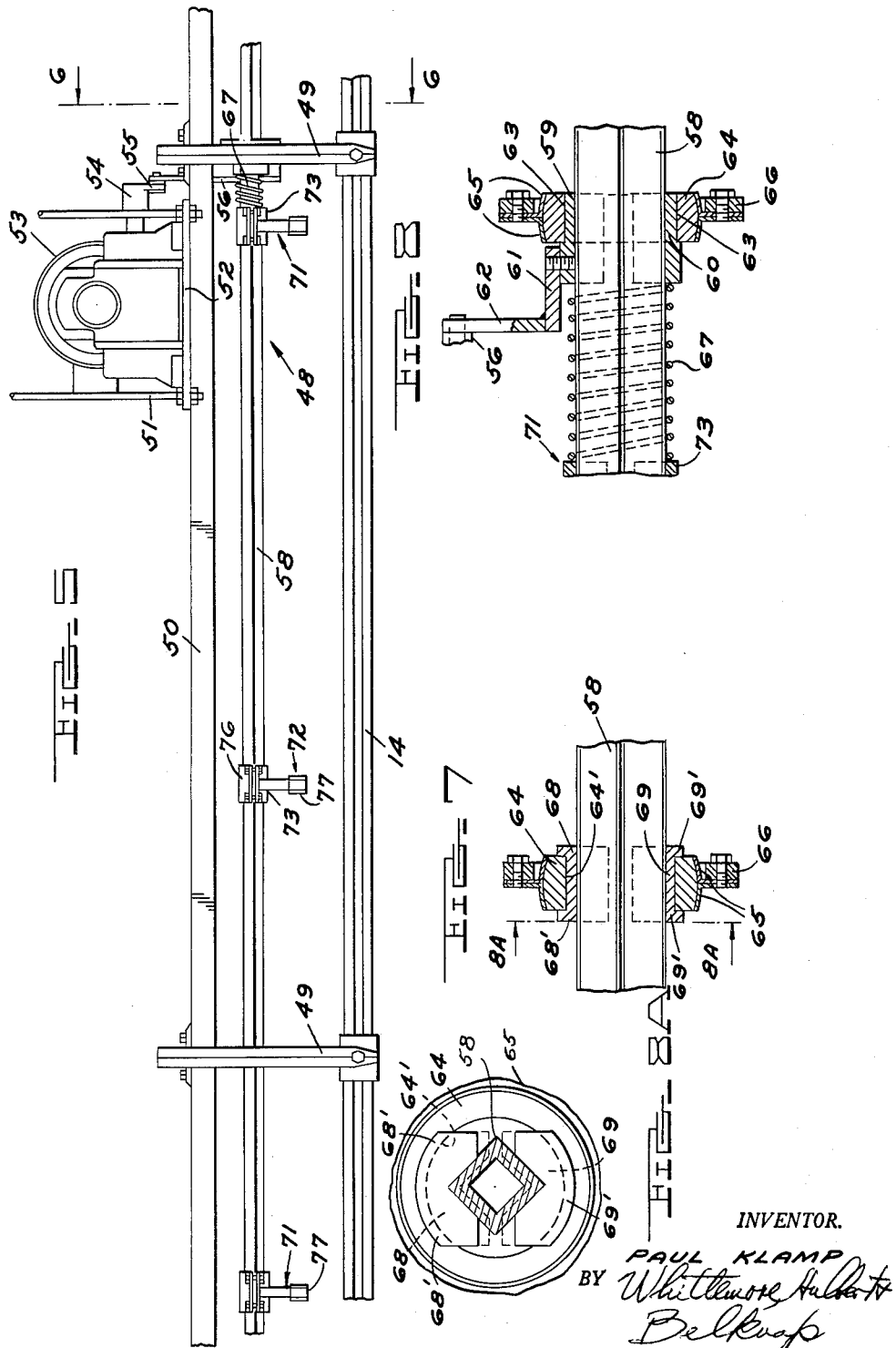

Feb. 13, 1962 P. KLAMP 3,020,854
RETARDER MECHANISM FOR FREE CONVEYOR LINE
Filed Sept. 21, 1959 4 Sheets-Sheet 4
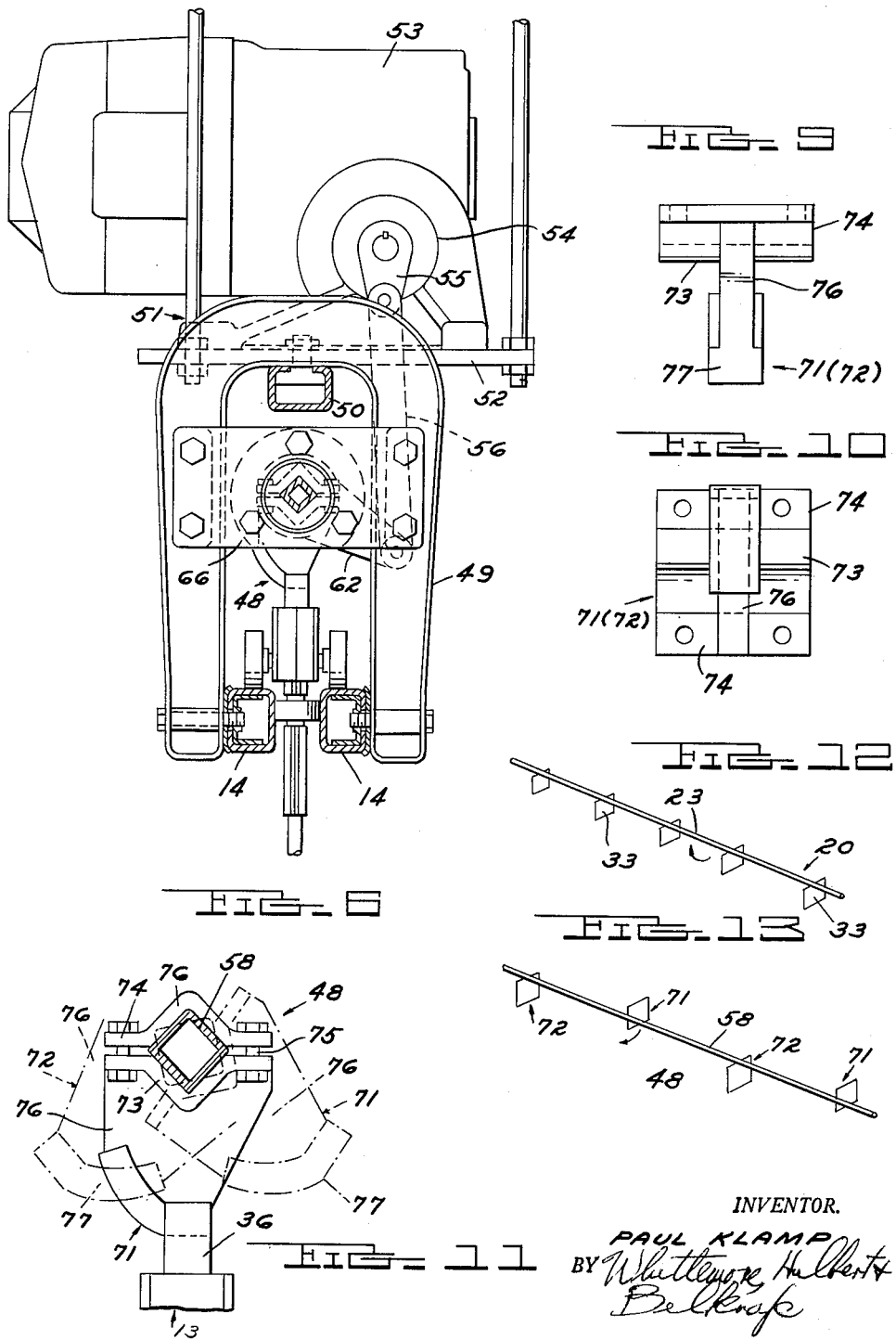
INVENTOR.
PAUL KLAMP
BY Whittemore, Hulbert
Belknap
ATTORNEYS

United States Patent Office 3,020,854
Patented Feb. 13, 1962

3,020,854
RETARDER MECHANISM FOR FREE
CONVEYOR LINE
Paul Klamp, St. Clair Shores, Mich., assignor to Mechanical Handling Systems, Inc., Detroit, Mich., a corporation of Michigan
Filed Sept. 21, 1959, Ser. No. 841,199
22 Claims. (Cl. 104—249)

The present invention relates to improvements in a mechanism for retarding overhead track trolleys or like load bearing units as they travel, usually gravitationally at a mild inclination, along a so-called free track. The improvement of the invention is especially designed for incorporation in a power and free conveyor system of the type illustrated and described in my Letters Patent No. 2,868,139 of January 13, 1959.

It is an object of the invention to provide a retarder mechanism of the type described, whereby the impetus of trolleys or like load bearing units may be checked as they travel along a free or equivalent track, thereby avoiding destructive impact as the heavily loaded units come together, as at a collection or accumulation station on the track in question.

More specifically, it is an object to provide a retarder mechanism as described which is adapted for installation adjacent a track of considerable length. The mechanism comprises shafting of the desired overall length, preferably constituted by tube sections coupled for a slight relative axial movement to accommodate end play and appropriately journalled at suitably spaced points, together with a series of plate-like blades on the shaft sections, and means to oscillate the shafting and blades.

Such oscillation of the blades is accomplished by an appropriate motor and crank drive for the shafting, in a timed way to periodically bring the blades in a downward arc into the path of movement of the trolleys, and more particularly, the conventionally pivoted propelling dogs thereof. While any given trolley, in gravitationally riding the trolley track, may miss engagement and retardation by one or more of the blades, it will have such engagement with one or more other of the blades, and be momentarily halted in its travel, thus avoiding damaging impact with the preceding trolley which is halted, for example, at an accumulation station.

It is a further object of the invention to provide a retardation mechanism of this sort which is well adapted for installation in a conveyor system incorporating a plurality of parallel free branch lines servicing an endless main conveyor chain. In an installation of this sort, the respective shafts of the retarder units paralleling the respective branch lines will be oscillated in common by a single prime mover and oscillatory driving connections, such as connecting rod and crank connections from a single prime mover to the several retarder mechanisms, in accordance with one embodiment of the invention. In another embodiment the individual shafts may be independently driven by separate motors, speed reducers and drive connections.

Of these two alternate adaptations of the principle of the invention, one may be termed a block or gang system of operation of the retarding blades, in that those blades are identically oriented, in the angular sense, along the axis of oscillation of the shaft which carries the same. Thus they all swing simultaneously into and out of retarding relation to a trolley or trolleys traversing the free track. This block type of operation may be desirable in certain installations in which a comparatively low rate of trolley traffic per minute is to be handled by the system.

In another embodiment of the invention, which may for convenience be designated an alternating operation, as distinguished from the block type, successively retarding blades are staggered angularly in relation to the operating shaft axis. This enables trolley traffic to be handled at a higher rate, in view of the fact that any given trolley is likely to pass one or more retarder blades in a position of the latter out of retarding position, as the trolley traverses the free line.

In these respects the two types of block and alternating installation may in a way be likened to different types of city automotive traffic control systems, in one of which a relatively long succession of traffic lights will simultaneously show "Stop" or "Go," and an alternating system in which successive lights will progressively change from "Stop" to "Go" and vice versa, enabling an uninterrupted travel of a motorist under optimum conditions and at a given rate of speed.

It is a still further object of the invention to provide a retarder mechanism as described in which, whether incorporated in a so-called block or alternating installation, improved provisions are made for coupling rigid shaft lengths together, preferably of rectangular box-like cross section, to provide desired overall track length; for journalling such lengths from an overhead support at spaced points along the overall length, and for the drive thereof, either independently of one another through individual motor-reducer units, or by a gang type of crank drive system.

Another object is to provide an improvement in such a mechanism, in which the shafting to which the retarder blades are secured is end-cushioned to absorb shock of impact of trolleys with the blading.

A still further object is to provide a retarder mechanism incorporating overhead shafting, whether of rectangular cross section or otherwise, in which improved means are provided for facilitating and expediting the assembly of the shafting to pre-installed overhead supports, preferably associated with the hanger provisions for the inclined free track. In acocrdance with this object, the shaft length is clamped at its ends and at a point or points intermediate its ends between split bushing members having internal surfaces which mate with the external surface of the shaft. The external surfaces of the bushings are quasi-cylindrical, being rotatably received within self-aligning socket bearing mounted by an overhead support.

In further accordance with the last named object, certain of the shaft bushings, in particular those at intermediate locations along the shafting, are radially flanged at their ends for coaction with an adjacet bearing surface to restrain end play of the bushings; and in accordance with the invention the bushing members are designed so that they may be contracted or collapsed toward one another, prior to insertion of a shaft length therethrough, sufficiently to enable their radial end flanges to clear within the internal bearing surfaces of the socket bearing whereupon, following such placement of the bushings with their flanges on either side of the bearing, they are expanded to receive the shaft length. Thus, initial installation of the retarder mechanism is greatly simplified and expedited.

The foregoing as well as other objects will become more apparent as this description proceeds, especially when considered in connection with the accompanying drawings illustrating the invention, wherein:

FIG. 5 is a fragmentary side elevational view of an alternative, alternating type of installation in accordance with the invention, in which a transversely staggered system of retarding blades is employed, the view showing an individual motor driven blade shaft;

FIG. 6 is a view in transverse vertical section on line 6—6 of FIG. 5;

FIGS. 7 and 8 are, respectively, fragmentary views in axial section showing details of structure by which a tubular blade shaft is journalled for oscillation intermediate its length, and by which the shaft has its overhead drive at another journalled point, respectively;

FIG. 8A is an end elevation, as viewed from a line corresponding to line 8A—8A of FIG. 7, of an improved socket bearing and bushing feature of the invention whereby installation of overhead shafting of the mechanism is facilitated and expedited, bushing components being shown in dotted line as collapsed for insertion in a pre-mounted bearing;

FIG. 9 is an elevational view, in enlarged scale, of one of the retarder blade components, there being a series of blade components of this sort arranged in right and left hand staggered relation along the shaft;

FIG. 10 is a bottom plan view of the blade component of FIG. 9;

FIG. 11 is a view in transverse section similar to FIG. 6, illustrating angularly staggered retarding blades and a trolley part upon which they act;

FIG. 12 is a schematic perspective view showing the action of a block type mechanism according to the invention; and FIG. 13 is a similar perspective view illustrating the action of an alternating type installation as compared with that of FIG. 12.

Figure 1:
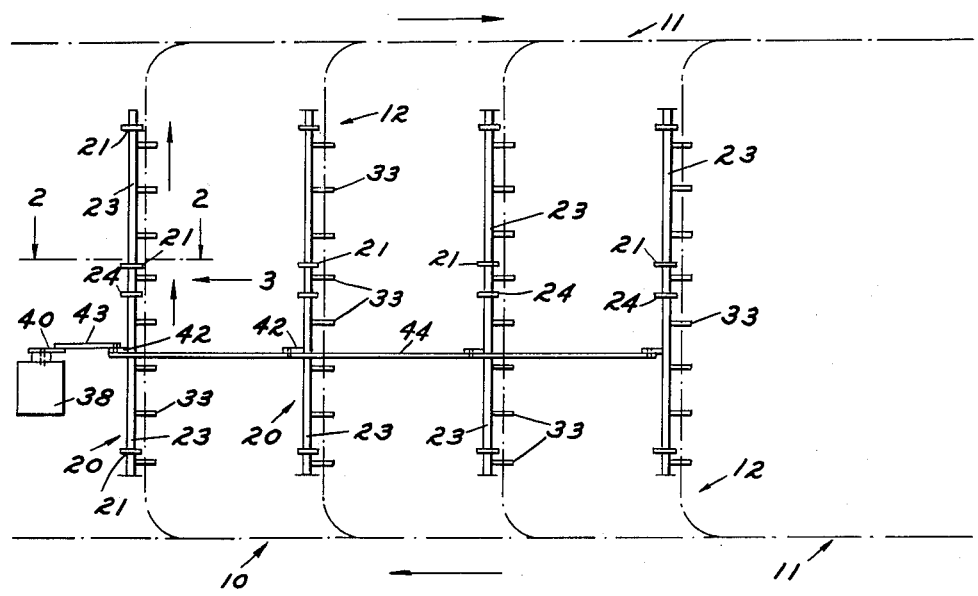
FIG. 1 is a schematic top plan view of a number of retarding units or mechanisms according to the invention, in one embodiment of the mechanism which may be referred to as the block or gang type, as applied to a conveyor system having a number of free branch lines.
Figure 2:
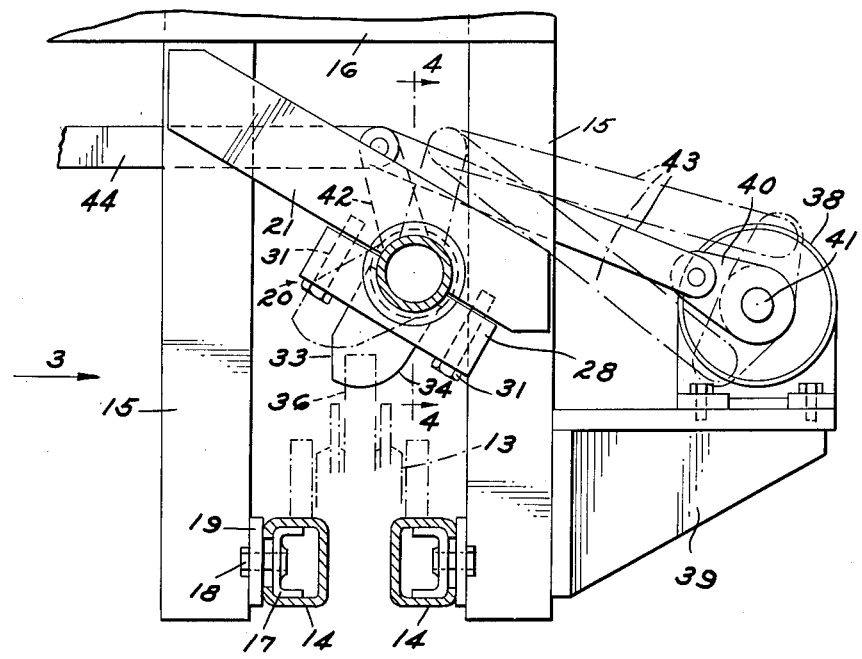
FIG. 2 is a fragmentary view in enlarged scale and in section along line 2—2 of FIGS. 1 and 3, showing the relationship of a retarder unit to a free track section and trolley (dot-dash line), as well as driving provisions for the several units of FIG. 1.
Figure 3:
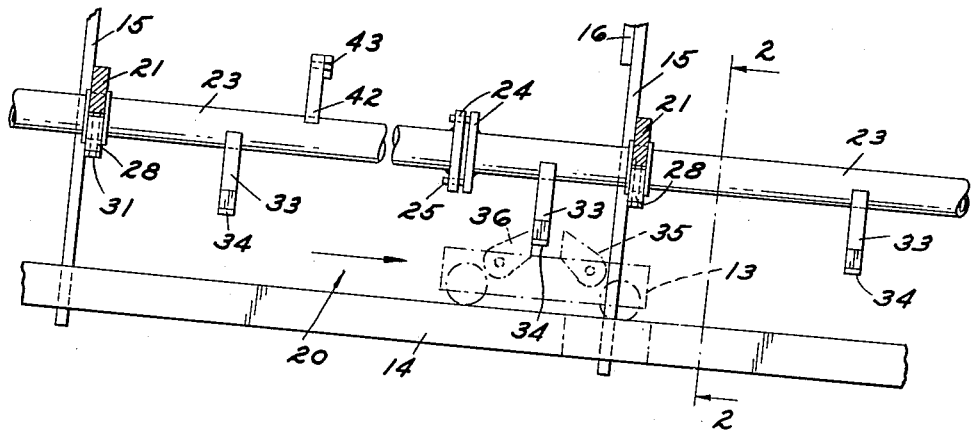
FIG. 3 is an elevational view, partially in vertical section, from the direction of the arrow 3 in FIGS. 1 and 2, showing the relationship of the retarder of an overhead free track section, in an angle of slope which is considerably exaggerated as compared to the inclination usually employed.

Referring to FIG. 1, the reference numeral 10 generally designates a typical factory overhead conveyor installation of the power and free type, including an endless main overhead conveyor and its power chain track, designated in FIG. 1 by the reference numeral 11, and a number of branch conveyor tracks, generally designated 12, extending between the parallel reaches of the power conveyor 11. As described in my copending application referred to above, and assuming that the main conveyor 11 travels in the direction of the arrows in FIG. 1, load bearing trolleys 13 of the sort shown in FIGS. 2 and 3 are, upon signal, switched from the main power conveyor line 11 onto one or the other of the branch tracks 12, along which they proceed under considerable momentum due to their sometimes very heavy loads. In traversing a branch line 12, the load on the conveyor may have some type of operation performed thereon, may be inspected, or may simply proceed to an accumulation zone or station along the branch track, there to await re-entry to the other reach of the main conveyor 11.

The reference numerals 14 in FIGS. 2 and 3 designate a pair of laterally spaced, parallel tracks, preferably of the type illustrated and described in the copending application of Leonard J. Bishop, Serial No. 820,525, filed June 15, 1959. These tracks extend the entire length between the parallel reaches of conveyor 11, with which they merge through rounded switching zones in a well known way. The tracks 14 are supported by an overhead superstructure, including rigid hangers 15 supported by a ceiling beam system 16, the supporting means including internal clamp irons 17 and bolts or studs 18 securing the tracks 14 to spacers 19 on the hangers 15. The sets of hangers 15 also serve as a support for the retarder unit of the invention, generally designated 20, which is sustained at spaced points along its length by angled plates 21 welded or otherwise suitably secured to the hangers 15 above the tracks 14. Unit 20 is of the block or gang type referred to above.

Figure 4:
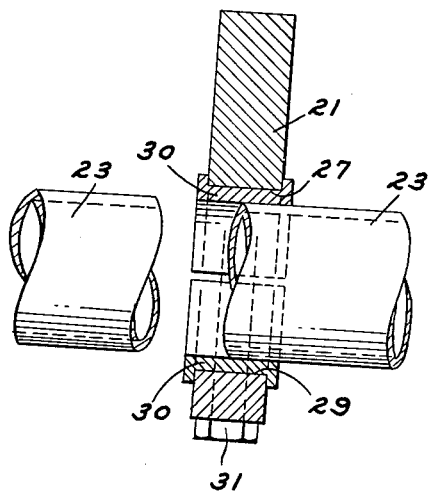
FIG. 4 is a fragmentary view, in vertical section along a line corresponding to the line 4—4 of FIG. 2, showing a detail of one of the several bearing devices for supporting the shafting of the retarder unit at spaced points along its extensive length.

As shown in FIGS. 3 and 4, each of the units 20 is preferably constituted of a series of elongated tubular shaft sections 23 of a length of say, 20 feet in a typical installation. The sections 23 are arranged in axial endwise alignment, and adjacent ends thereof are provided with annular flanges 24 which are drivingly coupled together by a series of pins 25 on one of the flanges engaged in apertures in the other. This permits a degree of endwise play, and ready dismantling of the shafts for replacement or repair of parts.

The shaft sections 23 are supported, at intervals of 5 feet or so, by the cross plates 21 in the fashion illustrated in FIGS. 2 and 4. That is, the members 21 are formed to provide semi-circular seats 27 and a plate-like retainer 28, also having a semi-circular seat 29, is provided to coact with each plate. The shaft 23 is received in flanged bushings 30 fitted in the respective seats 27, 29, and the retainer is taken up and held in place by bolts 31 extending therethrough and threadedly engaged in the cross member 21.

Retarder plates or blades 33 are welded or otherwise suitably secured to the shaft sections 23 at spaced points therealong. In a typical installation the spacing will be every two feet or so. Each blade 33 has an arcuate nose 34 and, as the shaft oscillates the blade 33 in a downward and lateral arc, as between the positions shown in solid and dot-dash line in FIG. 2, the nose 34 of one of more of the blades will be encountered by the usual forward restraining dog 35 of the advancing trolley 13 and then be engaged by its rear propelling or pusher dog 36, as shown in FIG. 3.

This halts the trolley 13 momentarily on the track ways 14, and the action may be repeated several times as the trolley progresses along the free branch track. It is to be understood that the dogs 35, 36 are counterweighted in such a way that the forward dog will swing counterclockwise, as viewed in FIG. 3, in passing beneath a blade 33. The timing of the oscillation of the shafting 23 is such that each blade has an oscillatory cycle of about six seconds, of which it is in position to halt the trolley for about 1½ to 2 seconds, being in position to clear the trolley dogs 35, 36 the remainder of the cycle. However, it will be appreciated that this timing of the sweep of the blades in cycles of like periodicity may be varied as desired, and in accordance with the number of blades, their spacing, and other considerations.

FIGS. 1 and 2 show a gang-driving arrangement for the several retarder units or mechanisms 20 of the system. This may comprise a suitable electric motor 38 supported on a bracket 39 on the superstructure, and equipped with a crank arm 40 fastened on its shaft 41. Motor 38 will be considered to incorporate suitable speed reducer means to effect an oscillatory cycle of the shafting such as referred to above. One of the sections 23 of each length of shafting of the retarder unit 20 is provided with a radial crank or operating arm 42, and the endmost such shaft adjacent the motor 38 has a connecting rod 43 pivoted at its ends to the respective motor and shaft crank arms 40, 42. Other units 20 are drivingly connected to the direct driven unit 20 of FIG. 2 by means of an elongated horizontal drive rod or bar 44, which, as illustrated in FIG. 1, is pivotally and drivingly connected at spaced points along its length to the operating or crank arms 42 of said other units 20.

It is believed that the action of each retarder unit 20, and their operation as a ganged system, will be evident from the foregoing description. Motor 38 rotates crank 40 and drives connecting rod 43 through the positions shown in solid and dot-dash line in FIG. 2, correspondingly oscillating the blades 33 of the respective units 20 to periodically intercept the trolleys 13 as they advance gravitationally along the track ways 14. The retarder is structurally simple and inexpensive, and is easily and speedily installed in any conveyor system. It enables the heavy jarring impacts of colliding loaded trolleys to be avoided, and insures an orderly arrival thereof at an accumulation station.

FIGS. 5 through 11 illustrate an alternative alternating type of retarder unit or mechanism, generally designated 48, as distinguished from the block type of FIGS. 1 through 4; and FIGS. 12 and 13 compare the mode of operation of these two types.

As illustrated best in FIG. 6, the slightly inclined free line tracks 14 are suspended by longitudinally spaced hangers 49 of inverted U outline, such as are illustrated and described in the copending Bishop application, identified above. These hangers are suspended in the manner described in that application, as by a longitudinal spine 50 supported by an overhead structure, generally designated 51, including a platform 52 upon which an individual electric drive motor 53 for the unit 48 is suitably supported. Motor 53 drives, through a suitable reducer 54, a crank 55 and pivoted connecting rod or link 56; and the mechanism or unit 48 is driven in this fashion through further connecting means, to be described.

The driving shaft of this embodiment is designated 58, being constituted by a single length or end-coupled lengths of tubular stock in a rectangular box-like cross section, as illustrated in FIGS. 6 and 11. At one end thereof (FIG. 8) the shaft 58 is clamped between special bushing members 59, 60 which have a corresponding angled interior surface to mate and nest with adjacent flat external surfaces of the shaft 58. As it is assembled, the bushing members 59, 60 are clamped together, and one thereof has secured thereto a plate 61 carrying a projecting crank arm 62, to the outer end of which the motor driven connecting rod or link 56 is pivotally connected.

The bushing members 59 have quasi-cylindrical external surfaces 63 received for piloted oscillation in a quasi-spherical, self-aligning annular bearing 64 which is clamped between opposed sockets 65 mating therewith and carried by a rigid support plate 66 extending transversely of the axis of the shaft and in a plane normal thereto. This plate is bolted to an adjacent hanger 49, as shown in FIG. 6. A coiled cushioning spring 67 surrounds shaft 58 and acts against bushings 59, 60 to absorb end shock on shaft 58 and the retarders thereon (to be described), when the latter are struck by a trolley 13.

The shaft 58 is similarly journalled at its opposite end, and at a suitable intermediate point or points, depending upon its length, spaced about five feet from one another. Thus, as illustrated in FIG. 7, it is equipped with intermediate pairs of like bushings 68, 69 in opposed relation to one another, each having flat 90° internal surfaces nesting on adjacent meeting surfaces of the shaft, these bushing members being received between socketed supports 64 and being suspended from a plate 66 in the same way as the bushing members 59, 60.

However, in order to restrain them from end play, bushings 68, 69, as shown in FIGS. 7 and 8A, are provided with integral radial flanges 68', 69' at either axial end thereof, which flanges have engagement with either adjacent side of the socket bearing 64. As illustrated in FIG. 8A, the bushings 68, 69 are truncated along parallel cords at either opposed side thereof, and the radial dimension thereof in the direction of these truncated sides is sufficiently small to enable the bushings to be brought together or collapsed relative to one another, i.e., from the respective solid line to the respective dotted line positions appearing in FIG. 8A, to permit the respective flanges 68', 69' to pass axially within the inner bearing surface of the self-aligning socket bearing 64, such surface being designated 64'. This permits positioning of the flanges properly on either side of the bearing, whereupon they are spread to the position shown in FIG. 7 and shaft 58 is inserted therethrough. Initial installation of the mechanism is thus greatly faciliated and expedited. However, as appears in FIG. 8, end bushings 59, 60 do not require double flanging.

As in the embodiment of FIGS. 1 through 4, the box-section shafting of the second embodiment may be assembled in partial lengths coupled, if desired, for end play by provisions such as are shown at 24, 25 in FIG. 3. These lengths may be of standard size for convenient shipment; and if the overall length after installation is great, it is preferable to drive the shafting at its middle in order to reduce torsional deflection.

Similarly, parallel shafts may be ganged and actuated from a common drive and linkage, in the fashion illustrated in FIG. 2, with coupling links corresponding to the drive rod or bar 44 operating from either or both sides of a geared-down motor.

The reference numerals 71 and 72 are employed to designate, respectively oppositely oriented or right and left hand retarder blades of the mechanism. In accordance with the general objective of the embodiment under consideration, although these blades 71, 72 are structurally identical, they are applied to the shaft 58 in staggered opposed relation to one another along its length.

Thus, as illustrated in FIGS. 9 and 10, each of the blades 71, 72 may comprise an inner clamping sleeve element 73 which has inner flat surfaces at 90° to one another to fit adjacent angular surfaces of the shaft 58; and the sleeve element 73 is outwardly flanged at 74 to receive bolts and studs 75, by which it is clamped to a similar sleeve element 76 mated against the opposite side of shaft 58.

The plates 71, 72 each further comprise a web 76 of plate-like nature extending radially outwardly of the sleeve element 73, this web being integrally formed to provide an arcuate retarder foot 77 of increased axial width along its outer edge. The character of the blades 71, 72, as their components 73, 76 are bolted to the shaft 58, is best shown in FIGS. 6, 9 and 10; and FIG. 5, considered with FIG. 11, reveals the fact that the successive blades 71, 72 are disposed in angular offset relation to one another. Thus, as the arcuate retarder foot 77 of one blade 71 swings from an inoperative, dot-dash line position shown in FIG. 11 to an operative, trolley holding position shown in solid line, the next blade 72 (illustrated in dotted line in FIG. 11) will be in the inoperative position as blade 71 is in operative retarding position; and vice versa.

It follows that, under oscillatory drive by the motor 53 through connecting link 56 and crank 62, the shaft 58 oscillates the successive blades 71, 72, in cycles of like periodicity an equal distance on opposite sides of the vertical plane, bringing the blades successively into and out of position for retarding engagement with the dogs 36 of trolleys 13. The action is schematically depicted in FIG. 13, and it will be appreciated that a trolley traversing the line of the tracks 14 at relatively high speed will not pass more than one retarder blade 71 or 72 without being stopped, and if it does not do so, it will be stopped by the succeeding blade 72 or 71. On the other hand, halting of the trolleys at each of the successive blades is usually avoided at lower speeds, so that the progress of the trolleys along the free tracks is speeded up on the whole. However, if a trolley should gain a higher speed as a result, it will be halted before impacting a preceding one. It is seen that the system of FIGS. 5 through 11 and 13 is capable of handling more traffic per minute than a block type system of FIGS. 1 through 4 and 12. However, stoppage of all trolleys at each of the retarder blades 33 of that form is in its general objective, so that it is not to be criticized in this regard.

Material handling problems of different factory and like installations require different solutions, and the alternative block and alternating arrangements will encompass all such requirements for the control of an overhead free conveyor line. Individual requirements in each category are easily and inexpensively met by simply adjusting the number or relative axial spacing of the respective blades 33 or 71, 72, by altering the rate of oscillation of the respective shafts 23, 58, or otherwise. Traffic volume handled can be increased or decreased as desired or required. In any adaptation of the principle of the invention, the goal is to handle the maximum required traffic, without permitting the speed of the trolleys to increase over a required average speed to handle this volume, or to drop below a speed suited to the requirement.

Reference has been made to the cushioning action of spring 67 (FIGS. 5 and 8) to absorb end shock on shaft 58 and the retarders 71, 72 thereon when the latter are struck by a trolley. The coil spring 67 encircles shaft 58, abutting at its right-hand end, as viewed in FIG. 8, the bushings 59, 60 which are rocked by the crank arm 62, and at its left-hand end it abuts a retarder unit 71 whereby to absorb shock thrust imparted to the shaft when any of the retarders 71, 72 is struck.

What I claim as my invention is:

1. A retarder mechanism of the type described, comprising an elongated shaft unit, means to mount the same in generally parallel relation to the longitudinal path of travel of a load unit, a series of retarder blades secured to said shaft unit at spaced points therealong, and means to operate said shaft unit in an arc to periodically bring said blades into travel obstructing position relative to said load unit.

2. A retarder mechanism of the type described, comprising an elongated shaft unit, means to mount the same in generally parallel relation to the longitudinal path of travel of a load unit, a series of retarder blades secured to said shaft unit at spaced points therealong, and means to operate said shaft unit in an arc to periodically bring said blades into travel obstructing position relative to said load unit, said blades being similarly oriented in longitudinal alignment along the axis of said shaft to simultaneously occupy said obstructing position.

3. A retarder mechanism of the type described, comprising an elongated shaft unit, means to mount the same in generally parallel relation to the longitudinal path of travel of a load unit, a series of retarder blades secured to said shaft unit at spaced points therealong, and means to operate said shaft unit in an arc to periodically bring said blades into travel obstructing position relative to said load unit, successive of said blades being staggered angularly relative to the axis of said shaft unit to occupy said obstructing position in alternation.

4. A retarder mechanism in accordance with claim 2, in which said shaft unit is oscillated in said arc to periodically bring said blades into travel obstructing relationship to said load unit from opposite angular directions.

5. A retarder mechanism in accordance with claim 3, in which said shaft unit is oscillated in said arc to periodically bring said blades into travel obstructing relationship to said load unit from opposite angular directions.

6. In combination with an inclined track adapted to support a trolley or like load unit for longitudinal travel, a retarder mechanism to periodically slow down the travel of said unit, comprising an elongated shaft unit and means to mount the same in an inclined position and generally parallel relation to said track, said shaft unit comprising a plurality of retarder blades secured to said shaft unit at spaced points therealong, and means to oscillate said shaft unit in an arc to periodically bring said blades into travel obstructing relationship to said load unit.

7. In combination with an inclined track adapted to support a trolley or like load unit for longitudinal travel, a retarder mechanism to periodically slow down the travel of said unit, comprising an elongated shaft unit and means to mount the same in an inclined position and generally parallel relation to and above said track, said shaft unit comprising a plurality of retarder blades secured to said shaft unit at spaced points therealong, and means to oscillate said shaft unit in an arc to periodically bring said blades downward into travel obstructing relationship to said load units.

8. In combination with an inclined track adapted to support a trolley or like load unit for longitudinal travel, a retarder mechanism to periodically slow down the travel of said unit, comprising an elongated shaft unit and means to mount the same in an inclined position and generally parallel relation to said track, said shaft unit comprising a plurality of shaft sections having means to drivingly connect the same in endwise alignment and for relative endwise axial movement, and a series of retarder blades secured to said sections of said shaft unit at spaced points therealong, and means to oscillate said shaft unit in an arc to periodically bring said blades into travel obstructing relationship to said load unit.

9. A conveyor system incorporating the combination of claim 6, and further comprising at least one further track and shaft unit as described paralleling said first named track and shaft unit, and means to oscillate said further shaft unit by the oscillating means for said first shaft unit.

10. A conveyor system incorporating the combination of claim 8, and further comprising at least one further track and shaft unit as described paralleling said first named track and shaft unit, and means to oscillate said further shaft unit by the oscillating means for said first shaft unit.

11. A retarder mechanism of the type described, comprising an elongated shaft unit of non-circular cross section, in generally parallel relation to the path of travel of a load unit, a series of retarder blades having means to mount the same at spaced points on and along said shaft unit, and means acting in cycles of like periodicity to operate said shaft unit in an arc to periodically bring said blades into travel obstructing relationship to said load unit, said blades being staggered in the angular sense relative to the axis of the shaft unit, said operating means acting to bring the respective staggered blades in alternation into said obstructing relationship.

12. A retarder mechanism of the type described, comprising an elongated shaft unit of non-circular cross section, in generally parallel relation to the path of travel of a load unit, a series of retarder blades having means to mount the same at spaced points on and along said shaft unit, said mounting means comprising coacting bushing elements having angularly related inner surfaces mating with and secured to the exterior of said shaft unit on opposite sides thereof, each of said blades being secured to one of said bushing elements, and means to operate said shaft unit in an arc to periodically bring said blades into travel obstructing relationship to said load unit.

13. A retarder mechanism of the type described, comprising an elongated shaft unit of non-circular cross section, in generally parallel relation to the path of travel of a load unit, a series of retarder blades having means to mount the same at spaced points on and along said shaft unit, said mounting means comprising coacting bushing elements having angularly related inner surfaces mating with and secured to the exterior of said shaft unit on opposite sides thereof, each of said blades being secured to one of said bushing elements, and means to operate said shaft unit in an arc to periodically bring said blades into travel obstructing relationship to said load unit, said blades being staggered in the angular sense relative to the axis of the shaft unit, said operating means acting to bring the respective staggered blades in alternation into said obstructing relationship.

14. A mechanism to retard the travel of load units traveling an overhead conveyor track, comprising a non-circular shaft, a support having means mounting the shaft adjacent and generally parallel to said track, including bushings having angularly related surfaces in surrounding mating and clamping engagement with said non-circular shaft, and bearing elements fixedly mounted by said support in which said bushings are received for oscillatory movement about the shaft axis, a series of obstructing blades fixedly carried by said shaft, and means to oscillate said shaft to bring the blades into obstructing relation to load units traveling said track.

15. A mechanism to retard the travel of load units traveling an overhead conveyor track, comprising a non-circular shaft, a support having means mounting the shaft adjacent and generally parallel to said track, including bushings in surrounding mating and clamping engagement with said non-circular shaft, and bearing elements fixedly mounted by said support in which said bushings are received for oscillatory movement about the shaft axis, a series of obstructing blades fixedly carried by said shaft, said blades being fixedly secured to certain of said bushings, and means to oscillate said shaft to bring the blades into obstructing relation to load units traveling said track.

16. A mechanism to retard the travel of load units traveling an overhead conveyor track, comprising a non-circular shaft, a support having means mounting the shaft adjacent and generally parallel to said track, including bushings in surrounding mating and clamping engagement with said non-circular shaft, and bearing elements fixedly mounted by said support in which said bushings are received for oscillatory movement about the shaft axis, a series of obstructing blades fixedly carried by said shaft, said blades being fixedly secured to certain of said bushings and being staggered in said series to extend in different radial directions from the shaft axis, and means to oscillate said shaft to alternately bring the staggered blades into obstructing relation to load units traveling said track.

17. A mechanism to retard the travel of load units traveling an overhead conveyor track, comprising a non-circular shaft, a support having means mounting the shaft adjacent and generally parallel to said track, including bushings in surrounding mating and clamping engagement with said non-circular shaft, and bearing elements fixedly mounted by said support in which said bushings are received for oscillatory movement about the shaft axis, a series of obstructing blades fixedly carried by said shaft, said blades being fixedly secured to certain of said bushings and being staggered in said series to extend in different radial directions from the shaft axis, one of said bushings having an operating portion, and means to oscillate said shaft to alternately bring the staggered blades into obstructing relation to load units traveling said track, including an operator and a driving connection between said operator and said bushing operating portion.

18. A retarder mechanism of the type described, comprising an elongated shaft unit, means to mount the same in generally parallel relation to the longitudinal path of travel of a load unit, a series of retarder blades secured to said shaft unit at spaced points therealong, means acting in cycles of like periodicity to operate said shaft unit in an arc to periodically bring said blades into travel obstructing position relative to said load unit, and means to mount said shaft unit, including a support and spring means acting between said shaft unit and support to sustain axial end shock upon impact of a load unit with one of the blades.

19. In combination with an inclined track adapted to support a trolley or like load unit for longitudinal travel, a retarder mechanism to periodically slow down the travel of said unit, comprising an elongated shaft unit and means to mount the same in an inclined position and generally parallel relation to said track, said shaft unit comprising a plurality of retarder blades secured to said shaft unit at spaced points therealong, and means acting in cycles of like periodicity to move said shaft unit in an arc to periodically bring said blades into travel obstructing relationship to said load unit, said mounting means comprising a fixed support, and means acting between said support and said shaft unit to cushion the latter on impact of a load unit with a blade.

20. A retarder mechanism of the type described, comprising an elongated shaft unit, means to mount the same in generally parallel relation to the longitudinal path of travel of a load unit, a series of retarder blades mounted in rotatively fixed relation to said shaft unit at spaced points therealong, and means acting in cycles of like periodicity to operate said shaft unit in an arc to periodically bring said blades into travel obstructing position relative to said load unit.

21. A retarder mechanism of the type described, comprising an elongated shaft unit, means to mount the same in generally parallel relation to the longitudinal path of travel of a load unit, a series of retarder blades mounted in rotatively fixed relation to said shaft unit at spaced points therealong, and means acting in cycles of like periodicity to operate said shaft unit in an arc to periodically bring said blades into travel obstructing position relative to said load unit, said blades being similarly oriented in longitudinal alignment along the axis of said shaft to simultaneously occupy said obstructing position.

22. A retarder mechanism of the type described, comprising an elongated shaft unit, means to mount the same in generally parallel relation to the longitudinal path of travel of a load unit, a series of retarder blades mounted in rotatively fixed relation to said shaft unit at spaced points therealong, and means acting in cycles of like periodicity to operate said shaft unit in an arc to periodically bring said blades into travel obstructing position relative to said load unit, successive of said blades being staggered angularly relative to the axis of said shaft unit to occupy said obstructing position in alternation.

References Cited in the file of this patent

UNITED STATES PATENTS

| | | |
|---|---|---|
| 1,265,446 | Hartman | May 7, 1918 |
| 2,078,503 | Meiser | Apr. 27, 1937 |